(12) United States Patent
Chung et al.

(10) Patent No.: US 7,777,948 B2
(45) Date of Patent: Aug. 17, 2010

(54) PROJECTION SCREEN

(75) Inventors: Yau-Wing Chung, Taipei (TW);
Chia-Yin Lu, Taipei (TW)

(73) Assignee: Optoma Corporation, Taipei (TW)

( * ) Notice: Subject to any disclaimer, the term of this patent is extended or adjusted under 35 U.S.C. 154(b) by 172 days.

(21) Appl. No.: 12/192,142

(22) Filed: Aug. 15, 2008

(65) Prior Publication Data
US 2009/0185269 A1 Jul. 23, 2009

(30) Foreign Application Priority Data
Jan. 23, 2008 (TW) .............................. 97102483 A (51) Int. Cl.
*G03B 21/56* (2006.01)
(52) U.S. Cl. ...................... 359/450; 359/461
(58) Field of Classification Search ................ 359/433, 359/450, 461; 396/3
See application file for complete search history.

(56) References Cited

U.S. PATENT DOCUMENTS 5,523,880 A * 6/1996 Pidgeon et al. ............. 359/450

| | | | |
|---|---|---|---|
| 6,873,460 B1 * | 3/2005 | Burstyn et al. | 359/461 |
| 7,042,640 B2 * | 5/2006 | Devos et al. | 359/443 |
| 7,489,443 B2 * | 2/2009 | Congard et al. | 359/461 |

FOREIGN PATENT DOCUMENTS

| | | |
|---|---|---|
| JP | 04-329083 | 11/1992 |
| JP | 6289490 | 10/1994 |
| JP | 11160795 | 6/1999 |
| JP | 2002333672 | 11/2002 |

* cited by examiner

*Primary Examiner*—Christopher Mahoney
(74) *Attorney, Agent, or Firm*—Jianq Chyun IP Office (57) ABSTRACT

A projection screen is disclosed, which includes an upper housing, an upper roller, a reflecting curtain, a lower housing, a lower roller, a lower mask and a positioning assembly. The upper roller is pivoted in the upper housing. The reflecting curtain is wound on the upper roller and has a reflecting surface to form a projection area. The lower housing is fixed at a free end of the reflecting curtain. The lower roller is pivoted in the lower housing. The lower mask is wound on the lower roller. The positioning assembly detachably connects a free end of the lower mask to the reflecting curtain, so that the lower mask covers a portion of the reflecting surface of the reflecting curtain to define the boundary of the projection area.

20 Claims, 10 Drawing Sheets

PROJECTION SCREEN

CROSS-REFERENCE TO RELATED APPLICATION

This application claims the priority benefit of Taiwan application serial no. 97102483, filed on Jan. 23, 2008. The entirety of the above-mentioned patent application is hereby incorporated by reference herein and made a part of this specification.

BACKGROUND OF THE INVENTION

1. Field of the Invention

The present invention generally relates to a projection screen, and more particularly, to a projection screen suitable for a projector.

2. Description of Related Art

A projector functions based on a working principle that an optical engine is used to make an image beam projected on a plane so as to produce an optical image. Since a projection screen has good optical characteristic, a user usually makes the image beam of the projector onto the projection screen for promoting the quality of the optical image. For conveniences of using and hiding the projection screen, the reflecting curtain of the projection screen may be folded by winding on a roller on a ceiling. The image beam output from a projector has several aspect ratios (ratios of length over width) depending on an optical image, but the projection area of the projection screen has only one aspect ratio. Therefore, it is required to provide a projection screen with a plurality of aspect ratios even with arbitrary aspect ratios.

SUMMARY OF THE INVENTION

Accordingly, the present invention is directed to a projection screen to provide a projection area with a plurality of aspect ratios.

An embodiment of the present invention provides a projection screen, which includes an upper housing, an upper roller, a reflecting curtain, a lower housing, a first lower roller, a first lower mask and a positioning assembly. The upper housing is pivoted in the upper housing. The reflecting curtain is wound on the upper roller and has a first reflecting surface to form a first projection area. The lower housing is fixed at a free end of the reflecting curtain. The first lower roller is pivoted in the lower housing. The first lower mask is wound on the first lower roller. The positioning assembly detachably connects a free end of the first lower mask to the reflecting curtain, so that the first lower mask covers a portion of the first reflecting surface of the reflecting curtain for defining the boundary of the first projection area.

In the above-mentioned embodiment of the present invention, the lower mask, which can be folded by winding in the housing at the free end of the reflecting curtain, may be unfolded upwards and detachably connected to the reflecting curtain. In this way, the projection area of the reflecting curtain is adjustable to have a required aspect ratio to meet the preset aspect ratio requirement of an optical image and an image beam produced by a projector.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
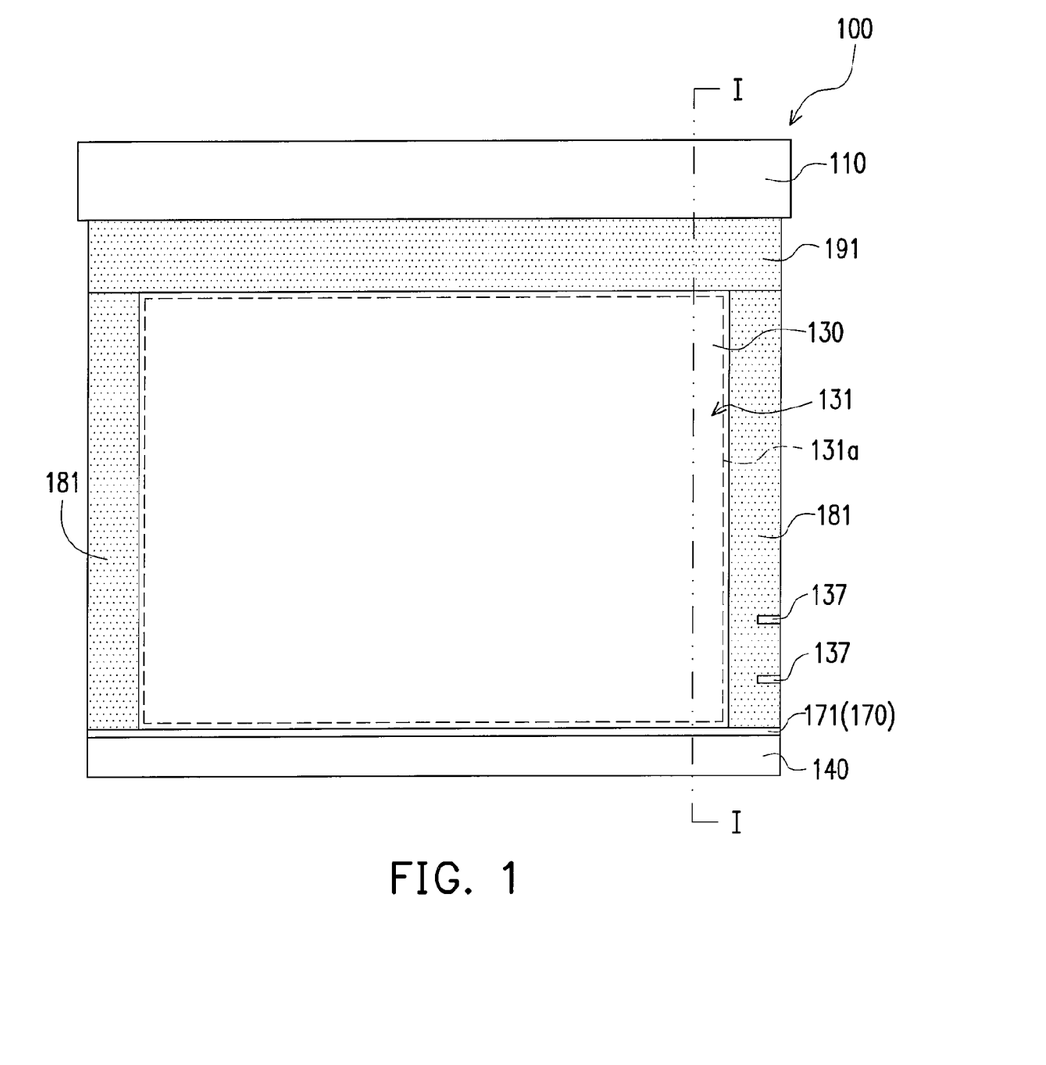
FIG. 1 is a front view of a projection screen according to an embodiment of the present invention.
Figure 2:
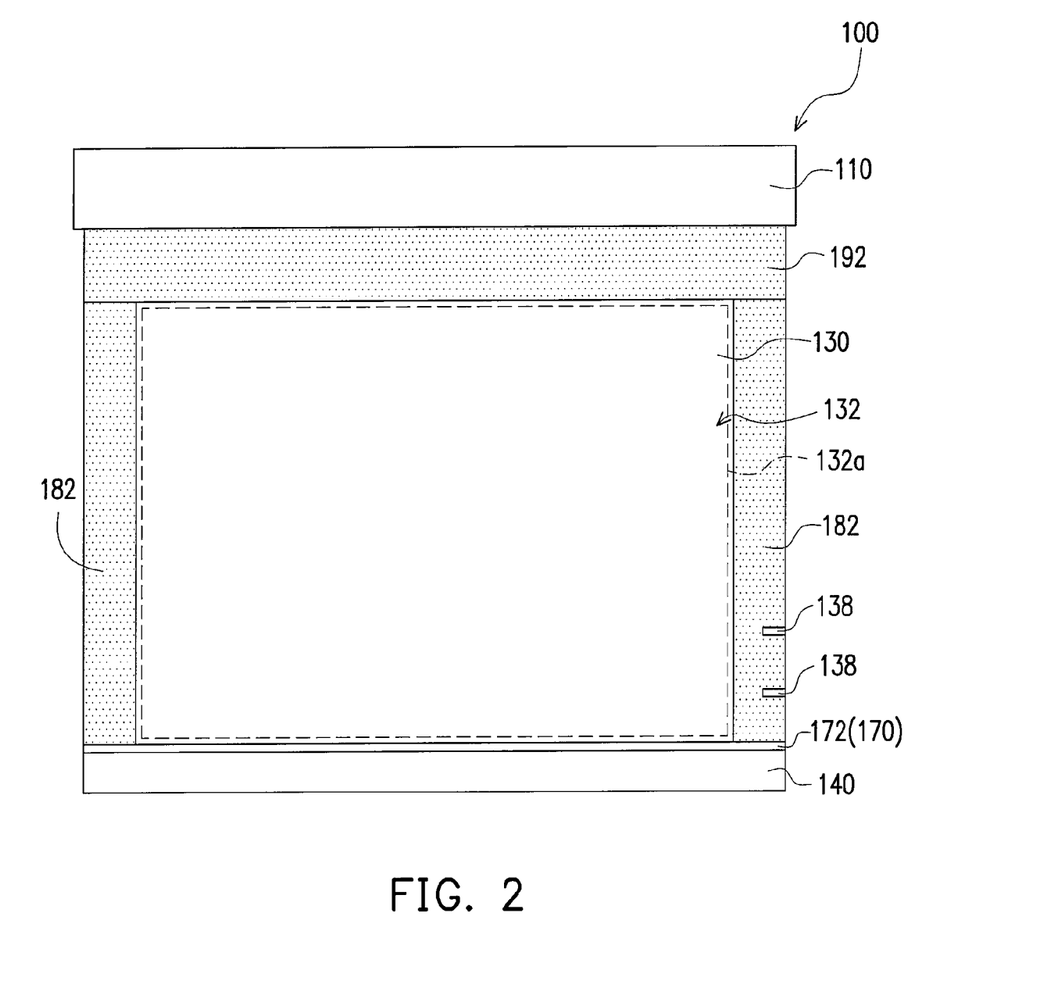
FIG. 2 is a rear view of the projection screen of FIG. 1.
Figure 3:
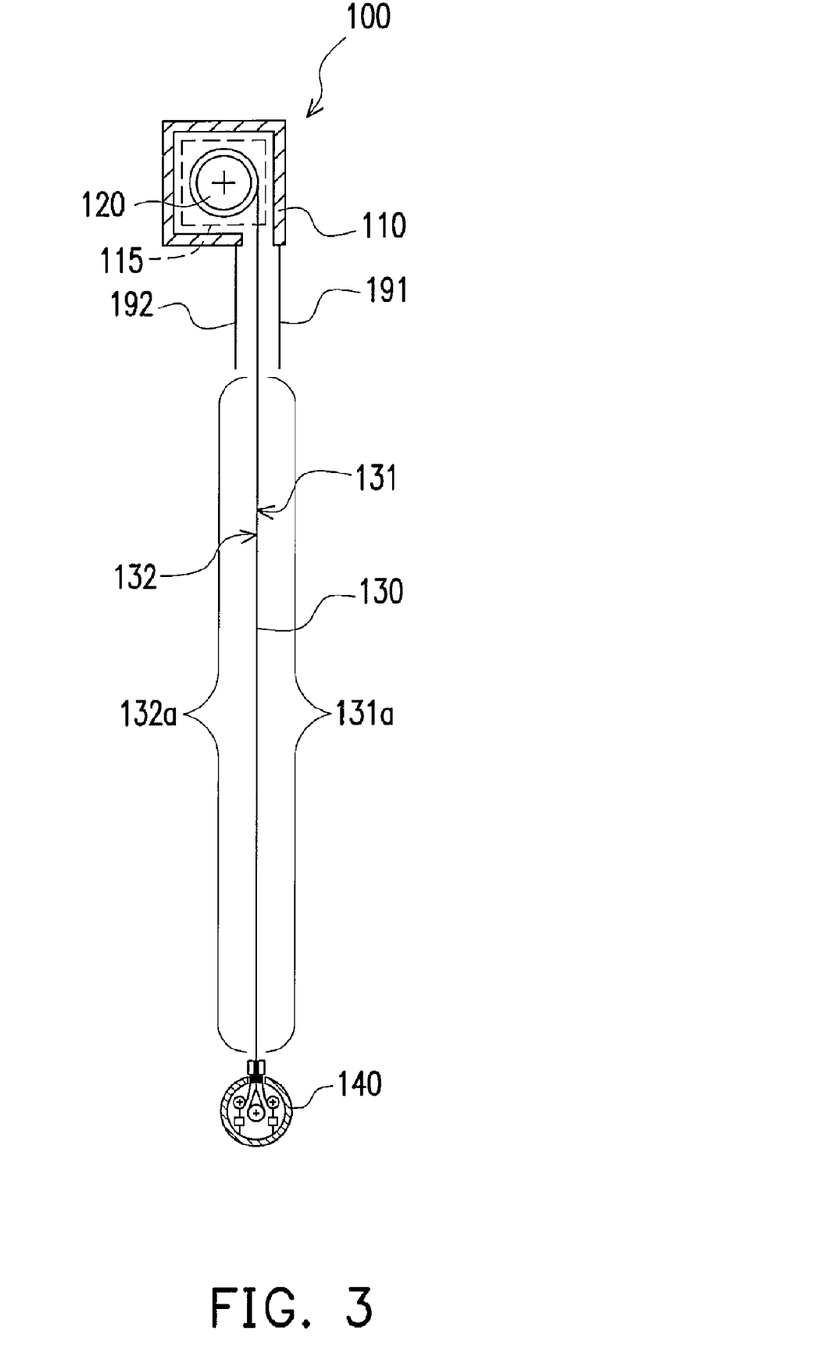
FIG. 3 is a cross-sectional view along line I-I in FIG. 1.

FIG. 1 is a front view of a projection screen according to an embodiment of the present invention, FIG. 2 is a rear view of the projection screen of FIG. 1 and FIG. 3 is a cross-sectional view along line I-I in FIG. 1. Referring to FIGS. 1 to 3, a projection screen 100 of the embodiment is suitably used in association with a projector so as to convert an image beam emitted from the projector into a 2-D optical image. The projection screen 100 has an upper housing 110, an upper roller 120 and a reflecting curtain 130. The upper roller 120 is pivoted in the upper housing 110, and the reflecting curtain 130 is wound on the upper housing 120 and has a first reflecting surface 131 so as to form a first projection area 131a, wherein the first projection area 131a may be covered by a mask for defining the boundary thereof.

In the embodiment, the projection screen 100 further includes an upper driver 115 disposed between the upper housing 110 and the upper roller 120 for driving the upper roller 120 to fold or unfold the reflecting curtain 130. The upper driver 115 may be a manual device or an electric device.

Figure 4:
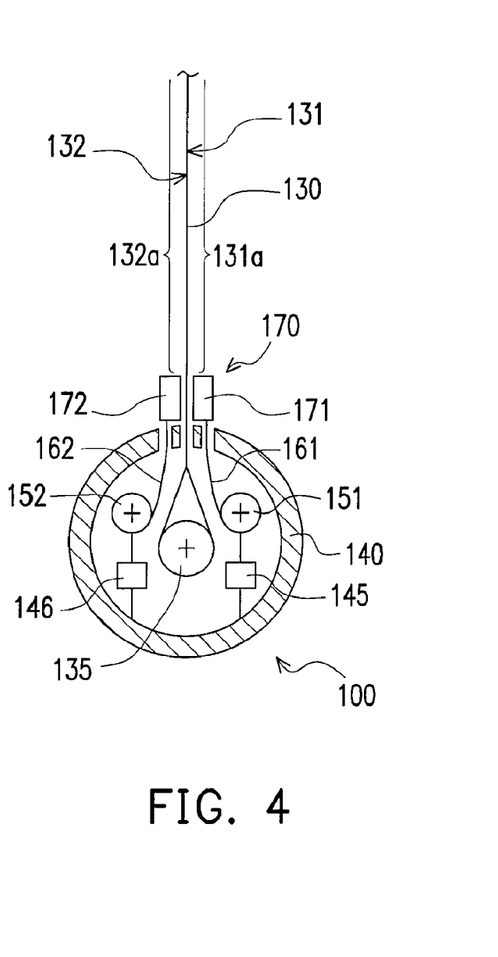
FIG. 4 is a locally enlarged view of the projection screen taking a first aspect ratio of FIG. 3.

FIG. 4 is a locally enlarged view of the projection screen taking a first aspect ratio of FIG. 3. Referring to FIGS. 3 and 4, the projection screen 100 further has a lower housing 140 fixed at a free end of the reflecting curtain 130. In the embodiment, the projection screen 100 further includes a fixed shaft 135 fixed in the lower housing 140, and the free end of the reflecting curtain 130 is fixed on the fixed shaft 135.

Figure 5:
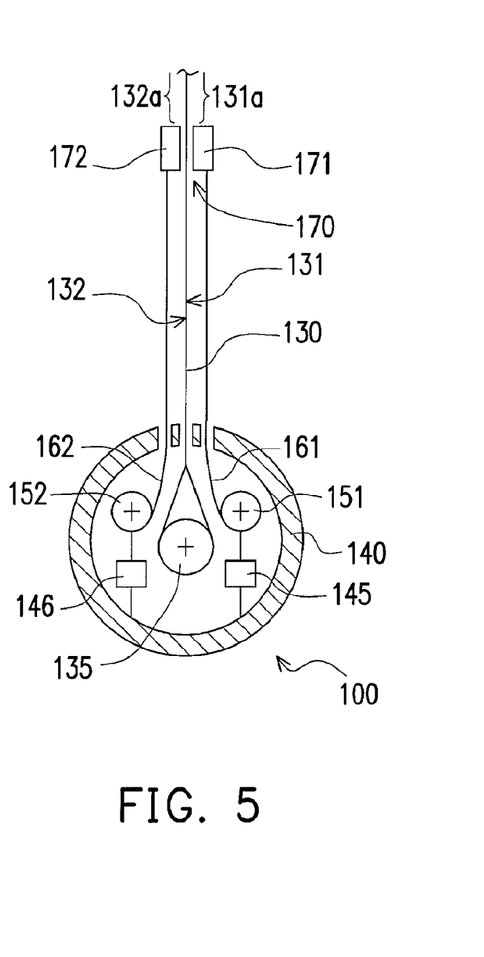
FIG. 5 is a locally enlarged view of the projection screen taking a second aspect ratio of FIG. 3.

FIG. 5 is a locally enlarged view of the projection screen taking a second aspect ratio of FIG. 3. Referring to FIGS. 4 and 5, the projection screen 100 further has a first lower roller 151, a first lower mask 161 and a positioning assembly 170. The first lower roller 151 is pivoted in the lower housing 140. The first lower mask 161 is wound on the first lower roller 151. The positioning assembly 170 detachably connects a free end of the first lower mask 161 to the reflecting curtain 130 so that the first lower mask 161 covers a portion of a first reflecting surface 131 of the reflecting curtain 130 for defining the boundary of the first projection area 131a. In this way, the aspect ratio of the first projection area 131a maybe adjusted.

In the embodiment, the positioning assembly 170 includes a first positioning component 171 and a second positioning component 172, and both are magnetic components. By a magnetic coupling between the first positioning component 171 and the second positioning component 172, the first lower mask 161 unfolded from the first lower roller 151 is detachably connected onto the reflecting curtain 130, so that the first lower mask 161 is able to cover a portion of the first reflecting surface 131 for defining the boundary of the first projection area 131a.

In the embodiment, the projection screen 100 further has a first lower driver 145 disposed between the lower housing 140 and the first lower roller 151 for driving the first lower roller 151 to fold by winding or unfold the first lower mask 161. The first lower driver 145 may be a manual device or an electric device.

In the embodiment, the projection screen 100 further has a pair of first side masks 181 respectively disposed at the two opposite sides of the reflecting curtain 130 to cover two portions of the reflecting surface 131 respectively for defining the boundary of the first projection area 131a. The pair of first side masks 181 may be formed on the reflecting curtain 130 by using printing or dyeing, or be composed of two masking objects adhesive or adsorbed on the reflecting curtain 130. In addition, the projection screen 100 further has a first upper mask 191 connected to the upper housing 110 to cover a portion of the first reflecting surface 131 for defining the boundary of the first projection area 131a.

Figure 6:
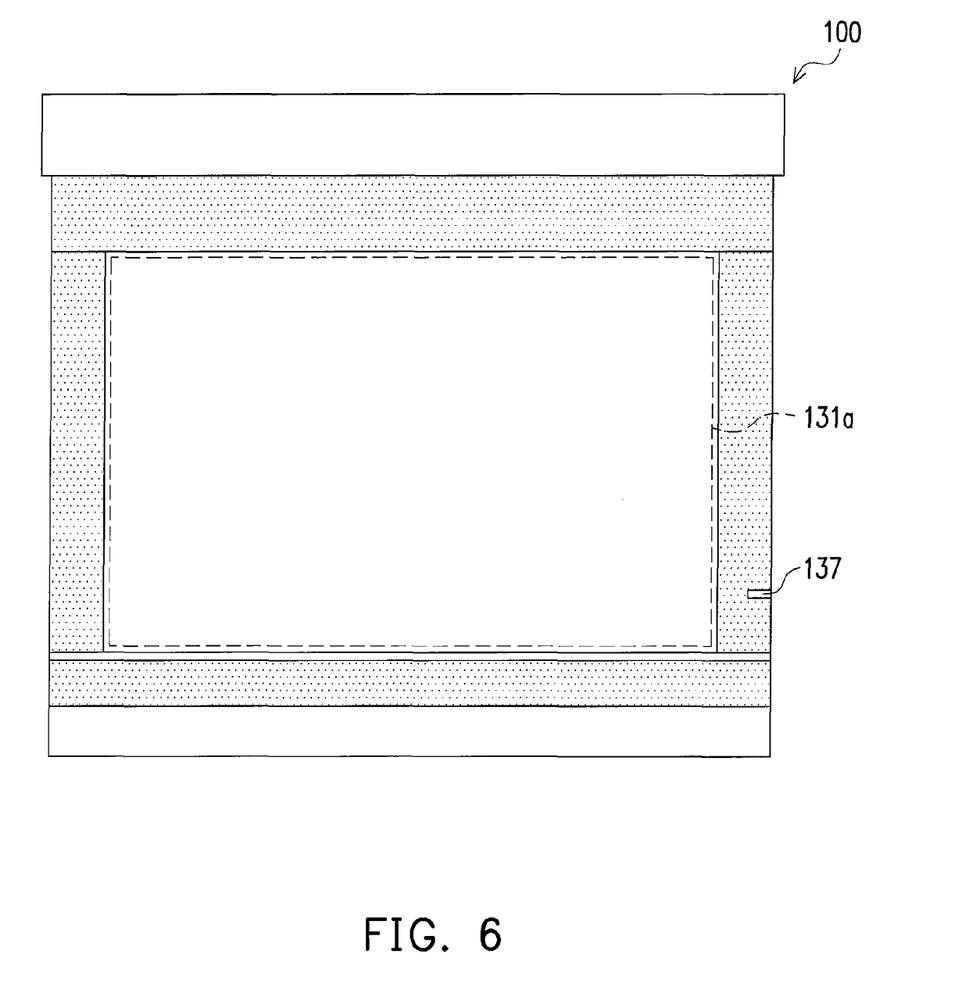
FIG. 6 is a front view of the projection screen taking a second aspect ratio of FIG. 1.
Figure 7:
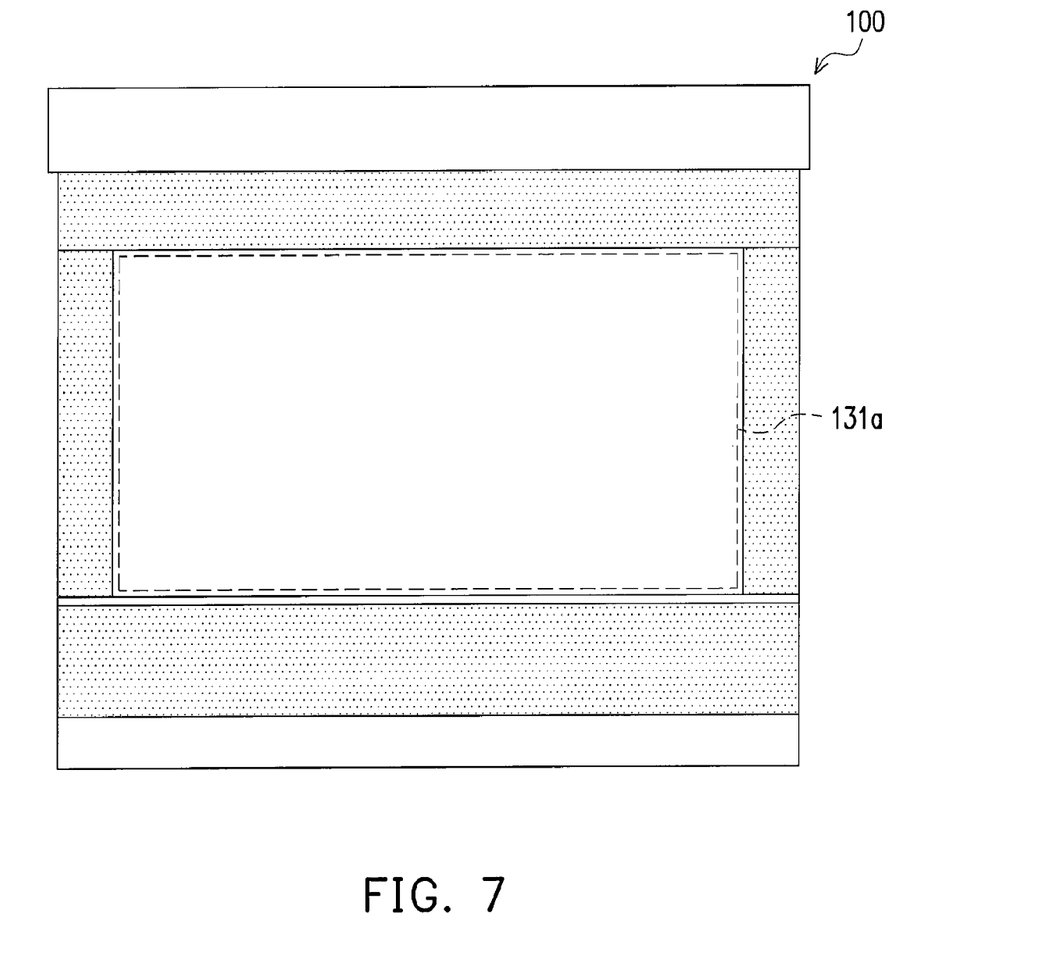
FIG. 7 is a front view of the projection screen taking a third aspect ratio of FIG. 1.

In the embodiment, the projection screen 100 further has a first index mark 137 or a plurality of first index marks 137, which is/are disposed on the reflecting curtain 130, wherein the first index marks 137 are directly disposed on the pair of first side masks 181 and indirectly disposed on the reflecting curtain 130. The first index marks 137 are served for reference to a user to adjust the aspect ratio of the first projection area 131a. For example, the first index marks 137 may respectively be "-16:9-" and "-2:1-". In this way, as the first lower mask 161 is unfolded referring to the first index marks 137, the first projection area 131a has at least two additional different aspect ratios, as shown in FIGS. 6 and 7.

In the embodiment, the projection screen 100 may further has a second lower roller 152 and a second lower mask 162, wherein the second lower roller 152 is fixed in the lower housing 140, and the second lower mask 162 is wound on the second lower roller 152. In addition, the second positioning component 172 is fixed at a free end of the second lower mask 162, and after the magnetic coupling between the second positioning component 172 and the first positioning component 171, the reflecting curtain 130 is held so as to fix the second lower mask 162 onto the reflecting curtain 130. If the reflecting curtain 130 further has a second reflecting surface 132 opposite to the first reflecting surface 131 and the second reflecting surface 132 forms a second projection area 132a, the second lower mask 162 may uncover or cover a portion of the second reflecting surface 132 for defining the boundary of the second projection area 132a. In this way, the aspect ratio of the second projection area 132a is adjustable.

In the embodiment, the projection screen 100 further has a second lower driver 146 disposed between the lower housing 140 and the second lower roller 152 for driving the second lower roller 152 to fold by winding or unfold the second lower mask 162. The second lower driver 146 may be a manual device or an electric device.

In the embodiment, the projection screen 100 further has a pair of second side masks 182 respectively disposed at the two opposite sides of the reflecting curtain 130 to cover two portions of the second reflecting surface 132 respectively for defining the boundary of the second projection area 132a. Similarly to the pair of first side masks 181, the pair of second side masks 182 may be formed on the reflecting curtain 130 by using printing or dyeing, or be composed of two masking objects adhesive or adsorbed on the reflecting curtain 130.

In addition, the projection screen 100 further has a second upper mask 192 connected to the upper housing 110 to cover a portion of the second reflecting surface 132 for defining the boundary of the second projection area 132a.

In the embodiment, the projection screen 100 may further has a second index mark 138 or a plurality of second index marks 138, which is/are disposed on the reflecting curtain 130, wherein the second index marks 138 are directly disposed on the pair of second side masks 182 and indirectly disposed on the reflecting curtain 130. The second index marks 138 are served for reference to a user to adjust the aspect ratio of the second projection area 132a. For example, the second index marks 138 may respectively be "-16:9-" and "-2:1-". In this way, as the second lower mask 162 is unfolded referring to the second index marks 138, the second projection area 132a has at least two additional different aspect ratios.

Figure 8:
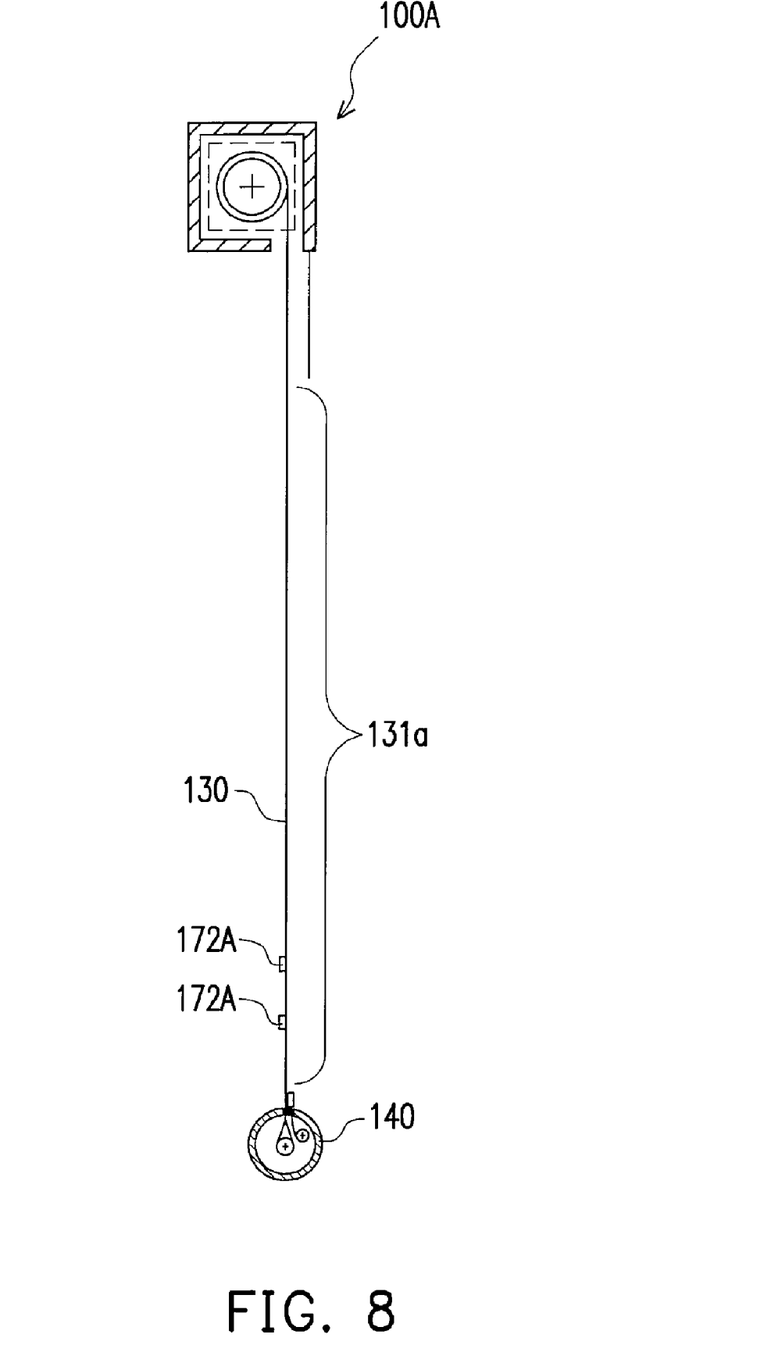
FIG. 8 is a cross-sectional view of a projection screen according to another embodiment of the present invention.
Figure 9:
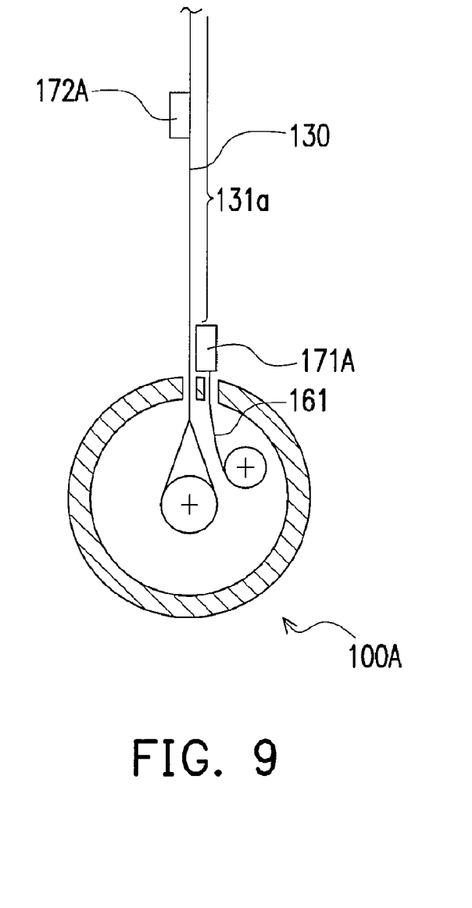
FIG. 9 is a locally enlarged view of the projection screen taking a first aspect ratio of FIG. 8.
Figure 10:
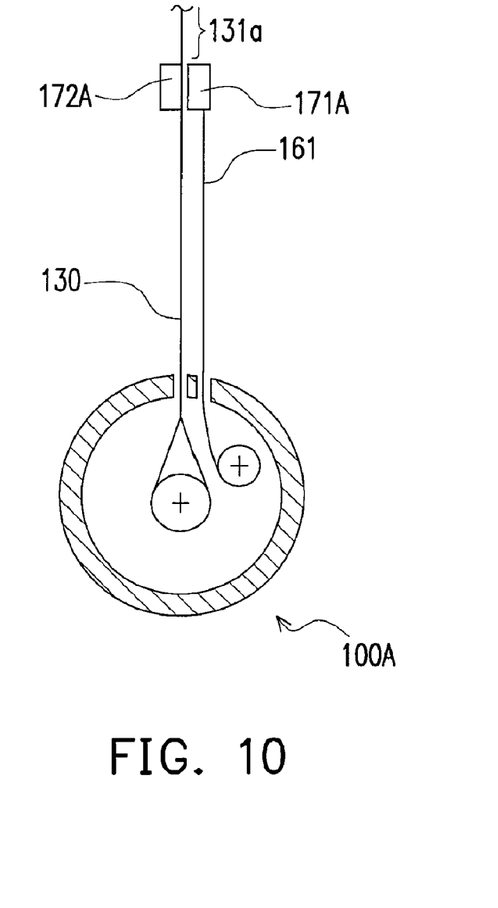
FIG. 10 is a locally enlarged view of the projection screen taking a second aspect ratio of FIG. 8.

FIG. 8 is a cross-sectional view of a projection screen according to another embodiment of the present invention, FIG. 9 is a locally enlarged view of the projection screen taking a first aspect ratio of FIG. 8, and FIG. 10 is a locally enlarged view of the projection screen taking a second aspect ratio of FIG. 8. Referring to FIGS. 8 and 9, differentially from FIG. 3 where the projection screen 100 may adjust the aspect ratios of the first projection area 131a and the second projection area 132a according to a real demand, a projection screen 100A of the embodiment includes a first positioning component 171A and a plurality of second positioning components 172A. The first positioning component 171A is fixed at the free end of the lower mask 161. The second positioning components 172A are fixed to the reflecting curtain 130, and the first positioning component 171A and one of the second positioning components 172A are detachably connected to each other, as shown by FIG. 10. In this way, the aspect ratio of the first projection area 131a is adjustable. In the embodiment, the first positioning component 171A and the second positioning components 172A are magnetic components.

Figure 11:
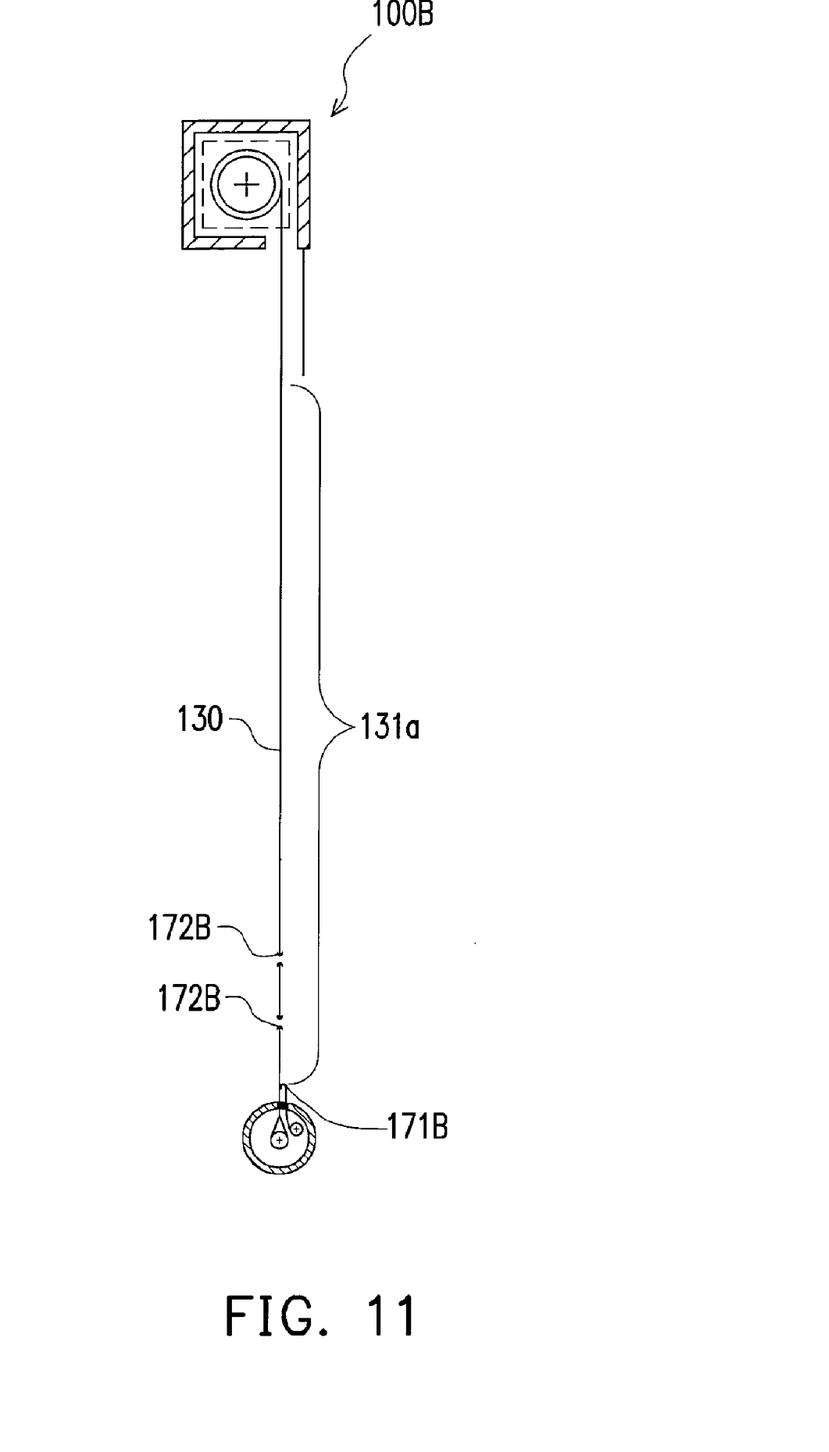
FIG. 11 is a cross-sectional view of a projection screen according to yet another embodiment of the present invention.
Figure 12:
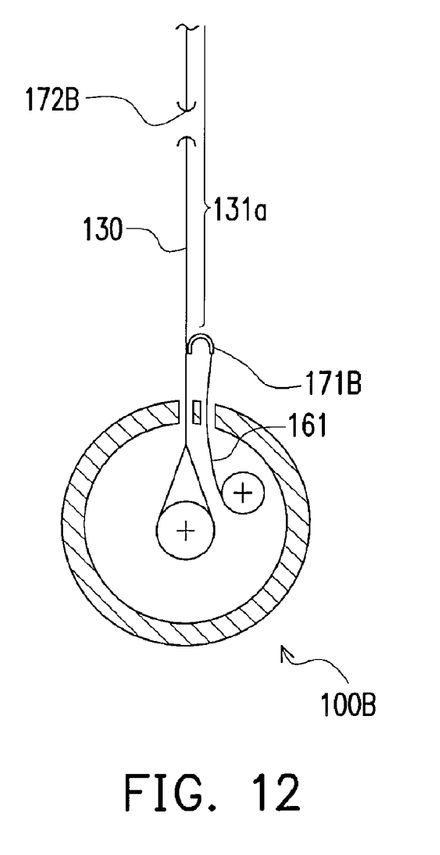
FIG. 12 is a locally enlarged view of the projection screen taking a first aspect ratio of FIG. 11.
Figure 13:
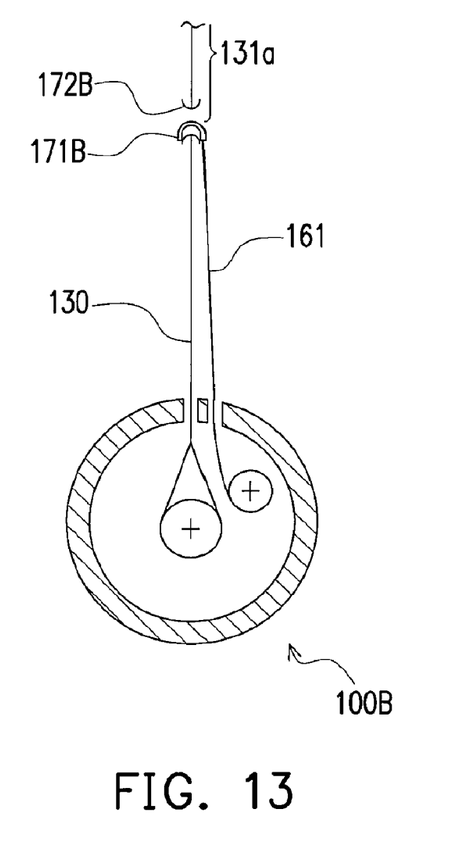
FIG. 13 is a locally enlarged view of the projection screen taking a second aspect ratio of FIG. 11.

FIG. 11 is a cross-sectional view of a projection screen according to yet another embodiment of the present invention, FIG. 12 is a locally enlarged view of the projection screen taking a first aspect ratio of FIG. 11, and FIG. 13 is a locally enlarged view of the projection screen taking a second aspect ratio of FIG. 11. Referring to FIGS. 11 and 12, in comparison with FIG. 8 where the first positioning component 171A and the second positioning component 172A of the projection screen 100A are magnetic components, the first positioning component 171B and the second positioning components 172B of the projection screen 100B are locking components. In the embodiment, the first positioning component 171B may be a locking hook and the second positioning components 172B may be locking rings.

In other un-shown embodiments, the first positioning component and the second positioning component may be an adhesive component or an added adhesive coat so as to enable the free end of the lower mask detachably connect the reflecting curtain. The above-mentioned adhesive component is, for example, demon belt, and the material of the above-mentioned adhesive coat may be various adhesives.

The color of the above-mentioned masks in the above-described embodiments may be a dark color. In addition, the material of the masks may be a non-reflecting material, for example, black cloth screen or dark-blue paper sheet. In other words, the color and the material of the masks are not restricted, but the reflectance of the masks needs to be lower than the reflectance of the reflecting curtain.

In the above-described embodiments, the lower mask in the housing is able to be folded by winding at the free end of the reflecting curtain and the lower mask may be upwards unfolded and detachably connected to the reflecting curtain. In this way, a required aspect ratio may be obtained by adjusting the projection area of the reflecting curtain to meet the requirement of the preset aspect ratio of the optical image converted by the image beam produced by a projector. For a user, the usage manner of upwards unfolding the lower mask is more convenient. The user may be, for example, an adult in seating for operating, where the user may conveniently draw the lower mask to be upwards unfolded and be fixed by the positioning component. The user may be a child as well for easily operating.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection screen, comprising:
    an upper housing;
    an upper roller pivoted in the upper housing;
    a reflecting curtain wound on the upper roller and having a first reflecting surface to form a first projection area;
    a lower housing fixed at a free end of the reflecting curtain;
    a first lower roller pivoted in the lower housing;
    a first lower mask wound on the first lower roller; and
    a positioning assembly detachably connecting a free end of the first lower mask to the reflecting curtain so as to make the first lower mask cover a portion of the first reflecting surface of the reflecting curtain for defining the boundary of the first projection area.

2. The projection screen according to claim 1, further comprising:
    a fixed shaft fixed in the lower housing, wherein the free end of the reflecting curtain is fixed on the fixed shaft.

3. The projection screen according to claim 1, further comprising:
    an upper driver disposed between the upper housing and the upper roller for driving the upper roller to fold by winding or unfold the reflecting curtain.

4. The projection screen according to claim 1, further comprising:
    a first lower driver disposed between the lower housing and the first lower roller for driving the first lower roller to fold by winding or unfold the first lower mask.

5. The projection screen according to claim 1, further comprising:
    a pair of first side masks respectively disposed at the opposite two sides of the reflecting curtain and located between the upper housing and the lower housing for covering two portions of the first reflecting surface respectively so as to define the boundary of the first projection area.

6. The projection screen according to claim 1, further comprising:
 a first upper mask connected to the upper housing for covering a portion of the first reflecting surface so as to define the boundary of the first projection area.

7. The projection screen according to claim 1, wherein the positioning assembly comprises:
 a first index mark disposed on the reflecting curtain.

8. The projection screen according to claim 1, further comprising:
 a second lower roller fixed in the lower housing; and
 a second lower mask wound on the second lower roller, wherein the positioning assembly comprises:
  a first positioning component fixed at the free end of the first lower mask; and
  a second positioning component fixed at a free end of the second lower mask and coupled to the first positioning component to hold the reflecting curtain so as to fix the first lower mask and the second lower mask onto the reflecting curtain.

9. The projection screen according to claim 8, wherein the first positioning component and the second positioning component are magnetic components.

10. The projection screen according to claim 8, further comprising:
 a first lower driver disposed between the lower housing and the first lower roller for driving the first lower roller to fold by winding or unfold the first lower mask; and
 a second lower driver disposed between the lower housing and the second lower roller for driving the second lower roller to fold by winding or unfold the second lower mask.

11. The projection screen according to claim 8, wherein the reflecting curtain further has a second reflecting surface opposite to the first reflecting surface, the second reflecting surface forms a second projection area, and the second lower mask covers a portion of the second reflecting surface so as to define the boundary of the second projection area.

12. The projection screen according to claim 11, further comprising:
 a pair of first side masks respectively disposed at the two opposite sides of the reflecting curtain and located between the upper housing and the lower housing to cover two portions of the first reflecting surface respectively so as to define the boundary of the first projection area; and
 a pair of second side masks respectively disposed at the two opposite sides of the reflecting curtain and located between the upper housing and the lower housing to cover two portions of the second reflecting surface respectively so as to define the boundary of the second projection area.

13. The projection screen according to claim 11, further comprising:
 a first upper mask connected to the upper housing to cover a portion of the first reflecting surface so as to define the boundary of the first projection area; and
 a second upper mask connected to the upper housing to cover a portion of the second reflecting surface so as to define the boundary of the second projection area.

14. The projection screen according to claim 11, wherein the positioning assembly further comprises:
 a first index mark disposed on a side of the reflecting curtain; and
 a second index mark disposed on the other side of the reflecting curtain.

15. The projection screen according to claim 1, wherein the positioning assembly comprises:
 a first positioning component fixed at the free end of the first lower mask; and
 a second positioning component fixed to the reflecting curtain so as to be detachably connected to the first positioning component.

16. The projection screen according to claim 15, wherein the first positioning component and the second positioning component are magnetic components.

17. The projection screen according to claim 15, wherein the first positioning component and the second positioning component are locking components.

18. The projection screen according to claim 1, wherein the positioning assembly comprises:
 a first positioning component fixed at the free end of the first lower mask; and
 a plurality of second positioning components fixed to the reflecting curtain, wherein the first positioning component is detachably connected to one of the second positioning components.

19. The projection screen according to claim 18, wherein the first component and the second positioning components are magnetic components.

20. The projection screen according to claim 18, wherein the first component and the second positioning components are locking components.

* * * * *